US008806470B2

(12) United States Patent  (10) Patent No.: US 8,806,470 B2
Fukatsu                    (45) Date of Patent:     Aug. 12, 2014

(54) SYSTEM, METHOD, AND APPARATUS FOR SOFTWARE MAINTENANCE OF SENSOR AND CONTROL SYSTEMS

(75) Inventor: Noriyasu Fukatsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 823 days.

(21) Appl. No.: 12/893,914

(22) Filed: Sep. 29, 2010

(65) Prior Publication Data

US 2012/0079470 A1    Mar. 29, 2012

(51) Int. Cl.
G06F 9/44    (2006.01)
G06F 9/445   (2006.01)

(52) U.S. Cl.
CPC ........................ G06F 8/65 (2013.01)
USPC ...................................... 717/169

(58) Field of Classification Search
None
See application file for complete search history.

(56) References Cited

U.S. PATENT DOCUMENTS

| 5,805,898 | A  | * | 9/1998  | Barsness et al. | 717/175 |
| 6,360,363 | B1 | * | 3/2002  | Moser et al.    | 717/170 |
| 6,711,738 | B1 | * | 3/2004  | Kuth et al.     | 717/173 |
| 6,763,517 | B2 | * | 7/2004  | Hines           | 717/124 |
| 7,051,327 | B1 | * | 5/2006  | Milius et al.   | 717/177 |
| 7,080,371 | B1 | * | 7/2006  | Arnaiz et al.   | 717/170 |
| 7,093,244 | B2 | * | 8/2006  | Lajoie et al.   | 717/168 |
| 7,454,745 | B2 | * | 11/2008 | Aridor et al.   | 717/122 |
| 2004/0031029 | A1 | * | 2/2004 | Lee et al.     | 717/171 |
| 2004/0093598 | A1 | * | 5/2004 | Haga et al.    | 717/173 |
| 2005/0071836 | A1 | * | 3/2005 | Hofler et al.  | 717/168 |
| 2006/0080656 | A1 | * | 4/2006 | Cain et al.    | 717/174 |
| 2006/0106845 | A1 | * | 5/2006 | Frank et al.   | 707/101 |
| 2007/0016432 | A1 | * | 1/2007 | Piggott et al. | 705/1   |
| 2007/0078956 | A1 |   | 4/2007 | VanGompel      |         |

FOREIGN PATENT DOCUMENTS

| JP | 10-185189    | A | 7/1998  |
| JP | 11-175345    | A | 7/1999  |
| JP | 2002-222005  | A | 8/2002  |
| JP | 2002-297388  | A | 10/2002 |
| JP | 2003-015879  | A | 1/2003  |
| JP | 2003-022233  | A | 1/2003  |
| JP | 2003-216430  | A | 7/2003  |
| JP | 2005-038063  | A | 2/2005  |
| JP | 2006-227871  | A | 8/2006  |
| JP | 2009-282934  | A | 12/2009 |

OTHER PUBLICATIONS

Japanese Office Action dated Jan. 10, 2012, issued in JP Application No. 2011-542619.
International Search Report dated Aug. 16, 2011, issued in PCT/JP2011/065522.

* cited by examiner

Primary Examiner — Jason Mitchell
(74) Attorney, Agent, or Firm — Sughrue Mion, PLLC

(57) ABSTRACT

A system and method for performing software maintenance of a programmable logic controller are provided. The system includes a programming tool and a controller. The programming tool is operable to update an execution environment of the controller and includes a controller type determination unit for reading a controller type of the controller and version information of an operating system thereof, an update information determination unit for reading update information corresponding to the controller type and the version information, an update area determination unit for determining a part of the execution environment to be updated based on the update information, and an updating unit for updating the determined part of the execution environment.

20 Claims, 13 Drawing Sheets

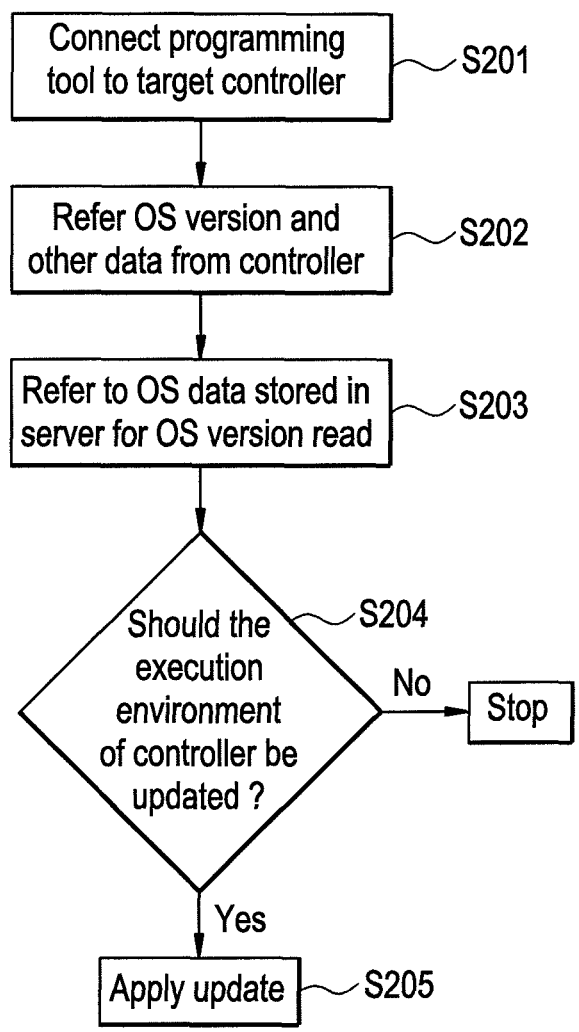

```
 0  LD     SM400
 1  MOV    U0\G20485      K4M40
 5  LD     M94
 6  AND    X19
 7  AND    M2
 8  AND    M42
 9  ANI    M430
10  PLS    M92
12  INC    C8
14  LD     M92
15  ZP.BUFRCV       "U0"   K3   D400   D430   M430
27  INC    C9
29  LD     M430
30  MPS
31  ANI    M431
32  INC    C430
34  MRD
35  AND    M431
36  INC    C431
38  MPP
39  INC    C10
41  END
```

SYSTEM, METHOD, AND APPARATUS FOR SOFTWARE MAINTENANCE OF SENSOR AND CONTROL SYSTEMS

BACKGROUND OF THE INVENTION

1. Field of the Invention

Apparatuses and methods consistent with the present invention relate to software maintenance in an industrial automation environment.

2. Description of the Related Art

In modern manufacturing facilities and particularly in the field of industrial automation, automated processes are often controlled by low-level automation and process control and monitoring systems. Low-level automation systems may include dedicated robotic devices or other automated systems controlled or monitored by programmable logic controllers (PLCs). Various sensing devices and instrumentation may be used to monitor such processes, such as machine vision systems, barcode readers, and various optical, electrical, electromechanical, and temperature sensors.

Typically, a user develops control logic such as a ladder program and the PLC (controller) executes this control logic in order to achieve the manufacturing process desired by the user. The control logic is stored in the controller's memory as user application software and is readable by the controller. The controller is provided with an execution environment in which the controller's processor can process the control logic and execute the user application. As this execution environment (much like an operating system in a personal computer) is part of the controller, the controller manufacturer is responsible for the maintenance of the execution environment. Controller's manufacturers often offer updates of the execution environment if there is a problem or shortcoming in the execution environment. Because the execution environment is stored in non-volatile memory, manufacturers often replace the entire controller to apply the update to the execution environment. This method leads to an increase in the support cost for the manufacturers of these controllers. Furthermore, the user has to stop a manufacturing process when updating its execution environment.

Therefore, there is a need for a system and method that would allow for efficient updates to the execution environment of a controller.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the above disadvantages.

According to a first aspect of the present disclosure, an exemplary method of updating an execution environment of a programmable logic controller is provided. The method includes reading a controller type of the controller and version information of an operating system thereof, reading update information corresponding to the controller type and the version information, determining a part of the execution environment to be updated based on the update information, and updating the determined part of the execution environment.

According to a second aspect of the present disclosure, a system for performing software maintenance of a programmable logic controller is provided. The system includes a programming tool and a controller. The programming tool is operable to update an execution environment of the controller and includes a controller type determination unit for reading a controller type of the controller and version information of an operating system thereof, an update information determination unit for reading update information corresponding to the controller type and the version information, an update area determination unit for determining a part of the execution environment to be updated based on the update information, and an updating unit for updating the determined part of the execution environment.

BRIEF DESCRIPTION OF THE DRAWINGS

The above and/or other aspects of the present invention will be made more apparent by describing certain exemplary embodiments of the present invention with reference to the accompanying drawings, in which:

FIG. 2 describes an exemplary procedure by which updates can be applied to an execution environment (operating system) of a controller (sequencer).

DETAILED DESCRIPTION OF EXEMPLARY EMBODIMENTS OF THE INVENTION

Figure 1:
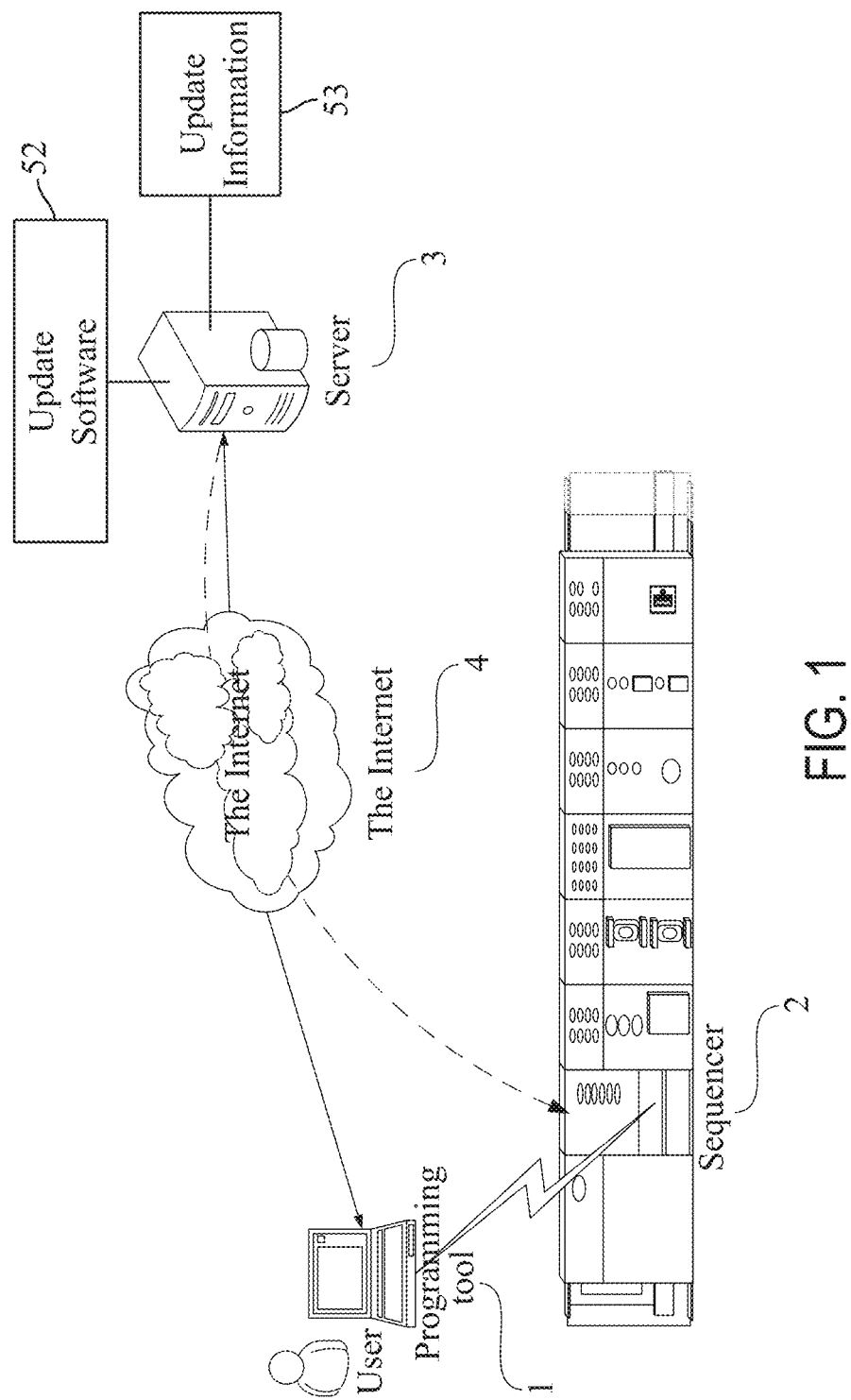
FIG. 1 describes an exemplary system configuration.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 describes a system configuration in accordance with an exemplary embodiment of the present disclosure. A programming tool 1 installs a program developed by the user to a control sequencer 2. The sequencer 2 is a device that controls the user's manufacturing process. The sequencer 2 may be a programmable logic controller (PLC). The sequencer 2 and the programming tool 1 may be connected to each other by various means such as a USB (Universal Serial Bus). The programming tool 1 may include a processor, which may have separate logic units or processing units that carry out different functions. Each of these different logic units could be implemented in software embodied on the processor. Server 3 is connected to programming tool 1 via Internet 4, and stores information and files necessary to maintain and update the software used by sequencer 2. Hereinafter, the words "sequencer" and "controller" are used interchangeably and refer to the sequencer 2. The server 3 may be a computer being managed by the manufacturer of the sequencer 3 or by another maintenance firm that supports sequencer 2. Server 3 is connected with Internet 4, and accepts predetermined requests based on prescribed URL. Server 3 may have hard disk drive unit as a storage unit and may store update software 52 (described later) and update information 53 (described later) prepared for maintenance and the renewal of sequencer 2 in the storage unit.

Next, FIG. 2 describes a procedure by which updates can be applied to an execution environment (operating system) of controller 2. In step 201, a customer connects the programming tool to the target controller which the customer wants to maintain. An OS (operating system) version of the target controller is read by the programming tool in step 202. In step 203, the programming tool refers to the OS data information stored on the server 3 for the OS version read from controller. In S204, the programming tool determines whether to apply an update to the execution environment of the controller. The programming tool also determines the contents of the update based on the OS version and other data the programming tool reads from the controller. In step 205, the programming tool applies the update to the execution environment of the controller if it is determined that an update should be applied. The above procedure is a high level description of the process envisioned by this disclosure. Details of the procedure will be explained next by explaining the structure of the controller in detail.

Figure 3A:
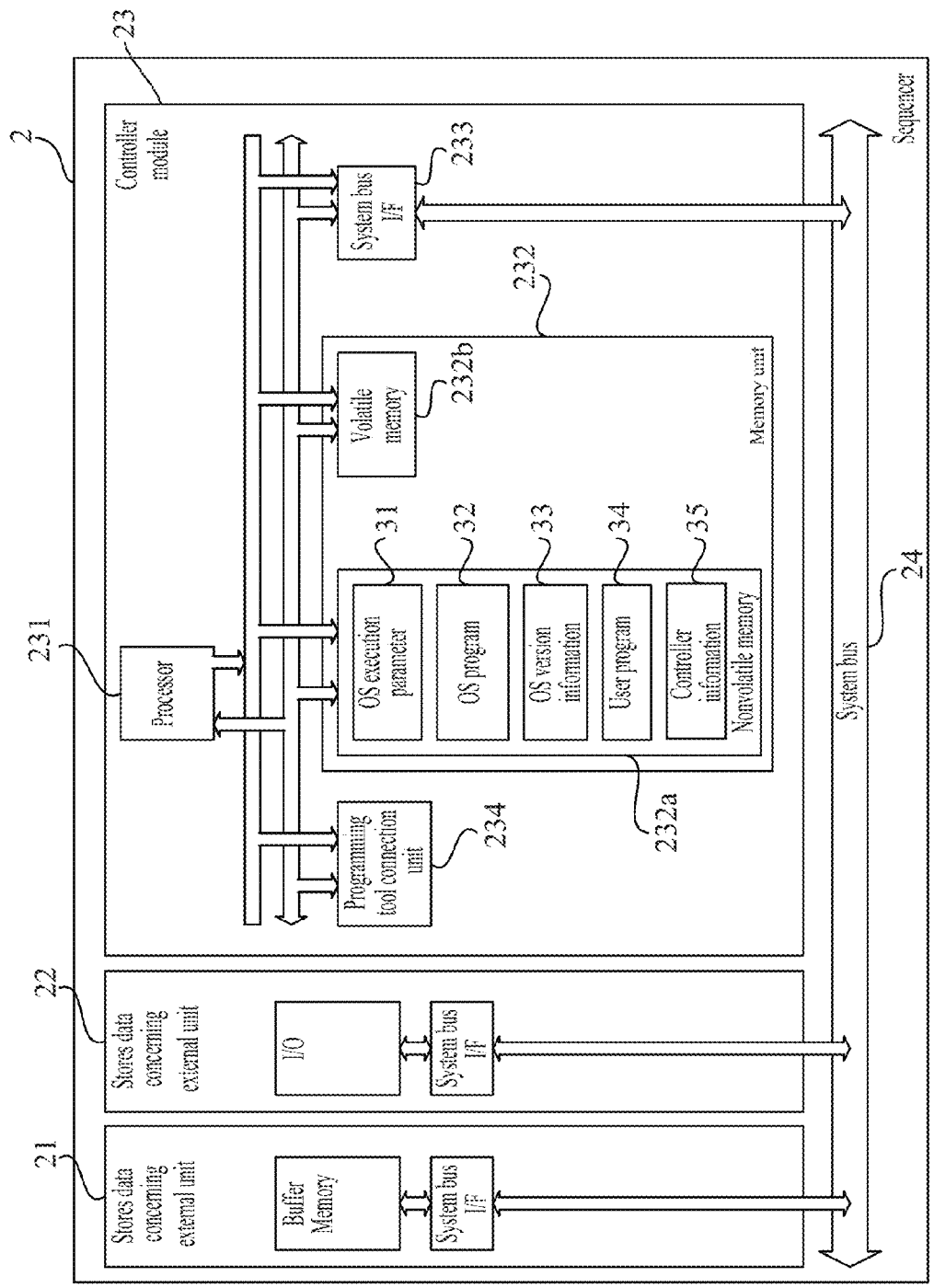
FIG. 3A describes an exemplary composition of a controller.

FIG. 3A describes the composition of sequencer 2. In the sequencer 2, external units 21 and 22 are connected to controller module 23 through system bus 24. The external units 21 and 22 are connected to external apparatus or instruments, not shown in the figure, such as sensors, lamps, actuators and servos. Those external apparatus or instruments carry out the manufacturing process. The external units 21 and 22 may be used for inputting and outputting digital information based on bits and/or analog signals.

Controller module 23 includes a processor 231, memory unit 232, system bus I/F 233, and programming tool connection unit 234. The controller module communicates with the system bus 24 through the system bus I/F 233. Processor 231 is a MPU (micro-processing unit) which executes the programs developed by the user and the also the operating system (OS) of the sequencer 2. Hereinafter, the programs developed by the user are called application programs. Memory unit 232 comprises non-volatile memory 232a and volatile memory 232b. Non-volatile memory 232a stores OS execution parameters 31, OS program files 32, OS version information 33, user programs 34, and controller information 35. Volatile memory 232b stores data concerning external units 21 and 22 acquired by system bus 24. However, it is possible that all or part of the information stored on non-volatile memory 232a is also stored on volatile memory for faster access.

The contents of memory unit 232 can be updated via different means such as carrier waves, RF signals, Ethernet signal, TCP/IP, etc. A non-exhaustive list of the storage medium would include the following: an electrical connection having one or more wires, a portable computer diskette such as a floppy disk or a flexible disk, magnetic tape or any other magnetic medium, a hard disk, a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer/controller can read or any suitable combination of the foregoing.

The programming tool connection unit 234 may include a network interface module through which the sequencer may communicate to the programming tool. The network interface module may include a network interface card coupled to a data bus. The network interface module provides a two-way data communication coupling to a network link that may be connected to a local network. For example, the network interface module may be an integrated services digital network (ISDN) card or a modem to provide a data communication connection to a corresponding type of telephone line. As another example, the network interface module may be a local area network interface card (LAN NIC) to provide a data communication connection to a compatible LAN. Wireless links, such as well-known 802.11a, 802.11b, 802.11g and Bluetooth may also be used for network implementation. In any such implementation, the network interface module 104 sends and receives electrical, electromagnetic or optical signals that carry digital/analog data streams representing various types of information.

OS execution parameters 31 include operation parameters of OS programs 32. For example, a watchdog timer setting may be included as an OS execution parameter 31. OS programs 32 refers to functions that utilize OS execution parameters to carry out certain operations. For example, an error handler function (such as a function that defines what happens when there is a division by zero or when a rule in user's code cannot be carried out by the controller) may be identified as an OS program 32. The OS programs 32 are designed so that their operation may change based on the operation parameter for each function. Another example of an OS program 32 may be a program that monitors the watchdog timer setting and stops execution of a currently running program if the watchdog timer setting has surpassed a certain value (for instance, 200 msec).

OS programs 32 represent program code which coordinates the overall functioning of the controller's execution environment. OS programs 32 is similar to the kernel code of an operating system of a personal computer. Just like the kernel code of an operating system, the OS programs 32 run in privileged mode and user programs such as a ladder program cannot change the OS programs or control the OS programs, whereas the OS programs control the execution of the user programs. Further, OS programs 32 is responsible for optimum execution of the controller hardware, managing and executing user sequence programs, communicating with programming tool, diagnosing controller hardware and reporting outcome of hardware diagnosis.

OS version information 33 is information used to identify the version of the present OS programs 32. User program 34 is a list of instructions to control the controller. In the field of factory automation, programs in the form of a ladder diagram are often used. Controller information 35 corresponds to information about the manufacturer of the controller, model name, type, etc.

Figure 3B:
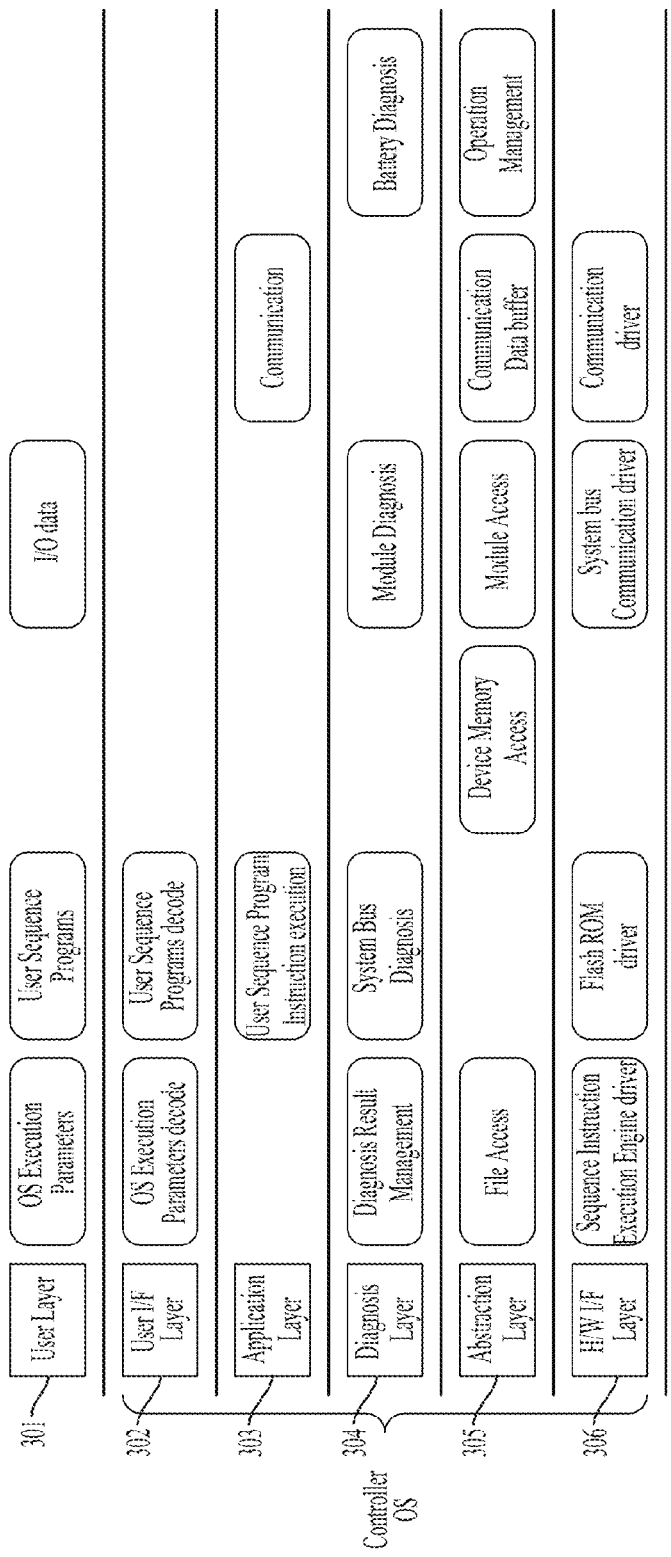
FIG. 3B describes an exemplary software structure of a controller.

FIG. 3B describes an internal software structure of the controller. A detailed description of FIG. 3B is provided after the description of FIG. 6.

Figure 4A:
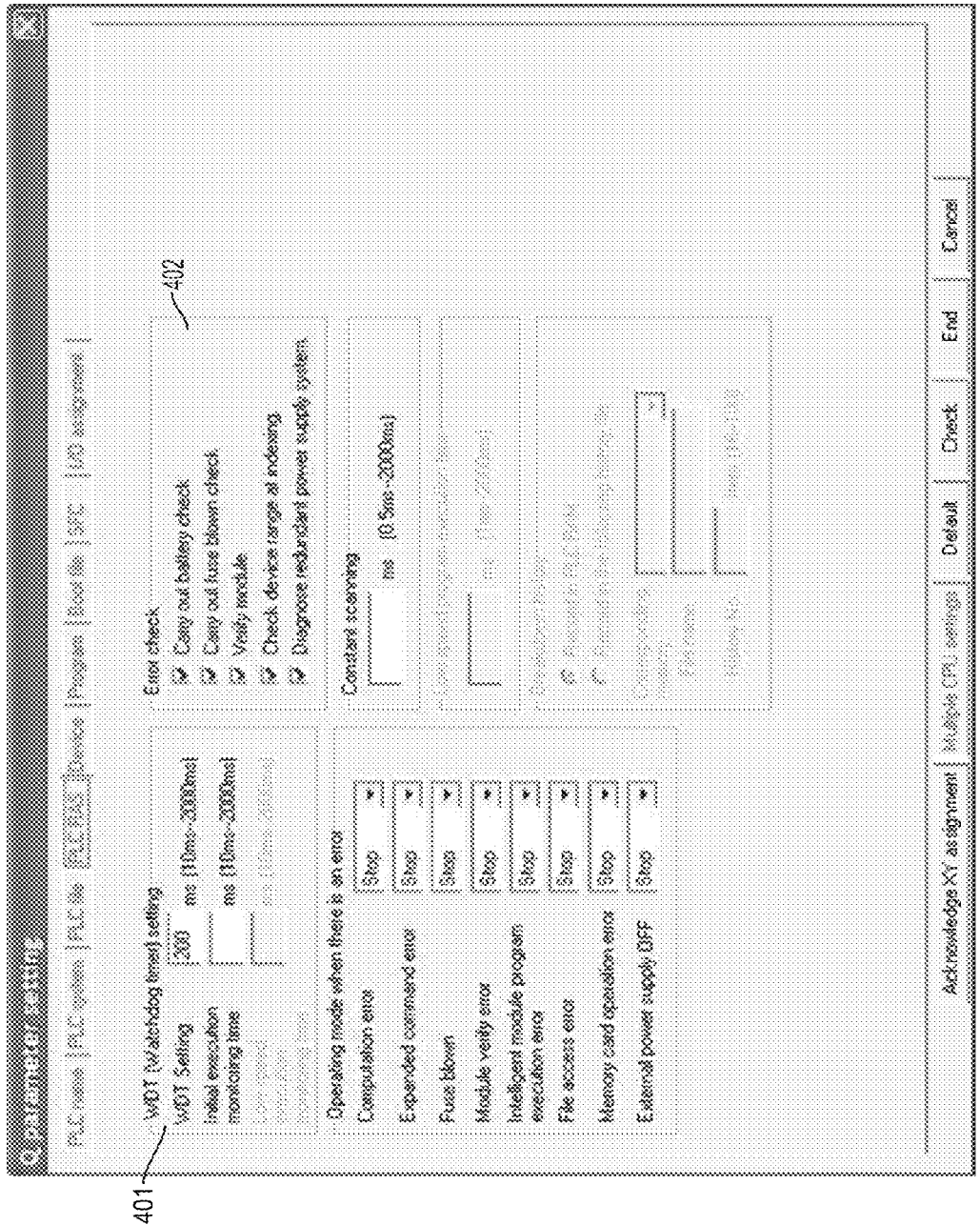
FIGS. 4A and 4B describe examples of OS execution parameters.
Figure 4B:
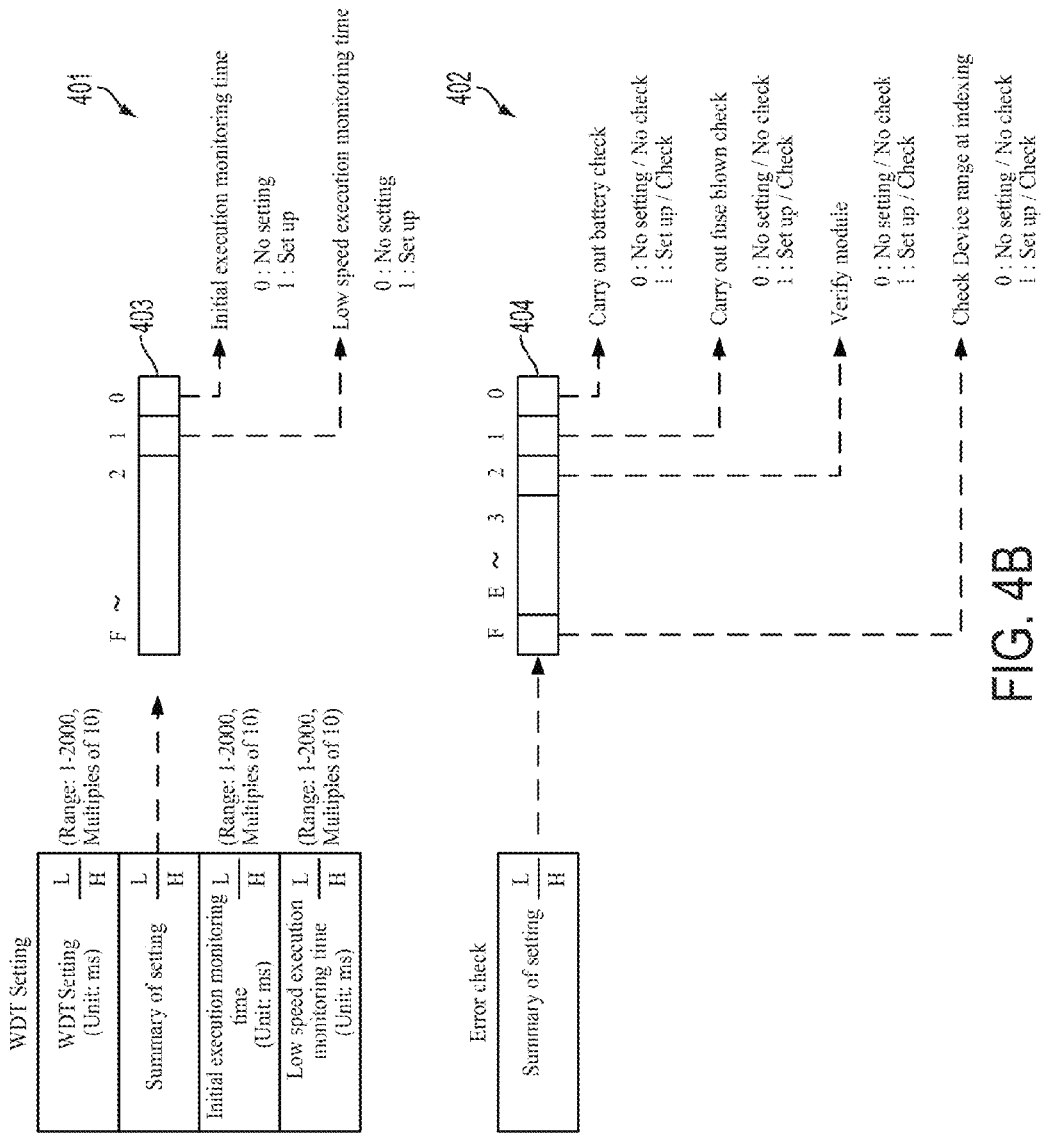

FIGS. 4A and 4B describe examples of OS execution parameters 31 in further detail. A watchdog timer (WDT) setting 401 is an example of an OS execution parameter 31. FIG. 4A shows a plurality of OS execution parameters through a graphical user interface. That is, the OS execution parameters can be configured using the graphical user interface. FIG. 4A also shows error check 402, which is another example of an OS execution parameter 31. The OS execution parameters may be configured as a data structure like MPU registers as shown in FIG. 4B. Data structure 403 refers to the WDT setting 401 and contains a plurality of bits which refer to the different parts of the WDT setting 401. For example, bit 0 of the data structure 403 specifies whether an initial execution monitoring time is turned on or off. Bit 1 specifies whether a low speed execution monitoring time is turned on or off. The remaining bits in data structure 403 may specify the value input in the WDT setting field in FIG. 4A. Similarly, data structure 404 specifies multiple bits related to the setting for the error check 402 in FIG. 4A. For example, bit 0 in data structure 404 is a '1' if the carry out battery check setting is checked by the user in FIG. 4A.

Figure 5:
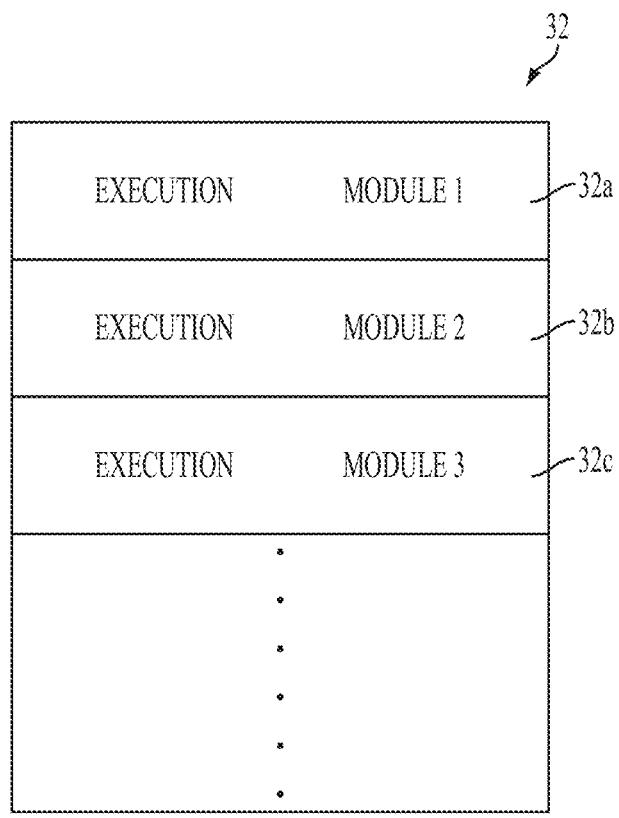
FIG. 5 describes the OS programs in further detail.

FIG. 5 now describes the OS programs 32 in further detail. As shown in FIG. 5, the OS programs 32 may be further divided into execution modules. For instance, an execution module 32a may implement certain error handlers, another execution module 32b may implement the watch dog timer, and another execution module 32c may implement instruction code, which includes instructions corresponding to the operators used in ladder programs. For example, the execution module 32 may include instructions such as LD, MOV, etc and their definitions.

Figure 6:
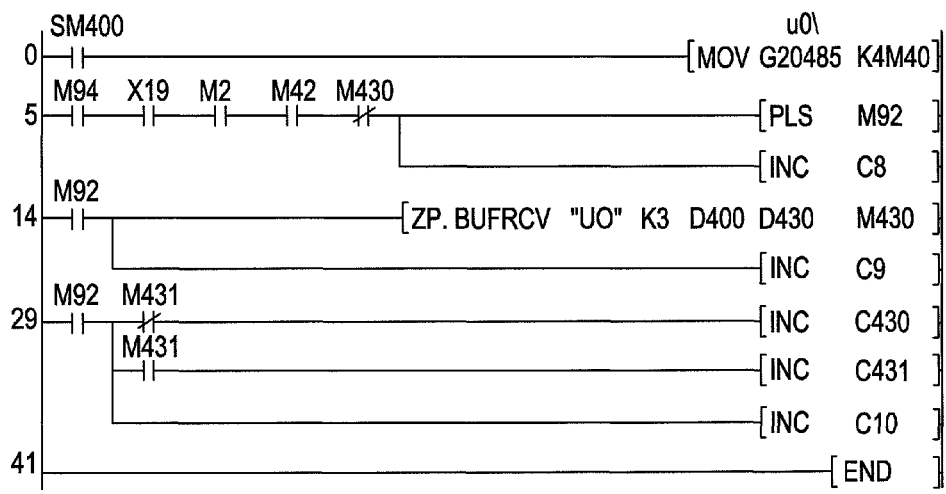
FIG. 6 describes an exemplary ladder program.

FIG. 6 describes an exemplary ladder program stored in user programs 34. The ladder program is a type of user application program. Each step of the ladder program is composed of an operand acted upon by an operator. The operator is an identifier that describes a type of operation. The operand is data or a variable on which the operator operates. For instance, a command LD SM400 is composed of the combination of operands named SM400 with the operator named LD. The operator LD is an instruction that may load the value stored in SM400 into memory. The LD instruction can also be defined such that data stored in memory is loaded into SM400. This LD instruction is only an example and different execution environments would define LD differently.

FIG. 3B illustrates an internal structure of the Controller software. The internal software structure of the controller can be broken down into seven layers. The OS program files 32 comprises five of the seven layers.

The User Layer 301 includes OS Execution Parameters and User Sequence programs, and I/O data. The User Layer isn't included in the Controller OS Program files 32, but the User Layer is closely related with the Controller OS Program files. OS Execution Parameters correspond to OS execution parameters 31 and User Sequence programs correspond to User programs 34. I/O data refers to input data and output data used for execution of User Sequence programs. The Controller gets input data from external units 21, 22 and executes the User Sequence programs and outputs data to the external units.

The User I/F Layer 302 is part of the Controller OS. More specifically, the User I/F layer 302 is part of the OS program files 32. The User I/F Layer includes functions such as OS Execution Parameters decode and User Sequence programs decode. The OS Execution Parameters decode function reads and decodes OS Execution Parameters. Similarly, the User Sequence programs decode function reads and decodes User Sequence Programs.

The Application Layer 303 is in charge of executing User Sequence Program. More specifically, the Application Layer 303 includes User Sequence Program Instruction execution which executes instructions decoded by the User Sequence Programs decode function in the User I/F layer 302. The Communication function handles communication between the Controller and the Programming tool.

The Diagnosis Layer 304 is also part of the OS program files 32 and is in charge of checking and diagnosing the controller itself. The Diagnosis Result Management stores the diagnosis results from the different diagnosis functions such as the system bus diagnosis function, the module diagnosis function, and the battery diagnosis function. The System Bus Diagnosis is in charge of checking status of the System Bus. The Module Diagnosis is in charge of checking status of the controller module itself and external units. The Battery Diagnosis is in charge of checking status of battery.

Abstraction Layer 305 includes functions for File Access, Device Memory Access, Module Access, Communication Data buffer, and Operation Management. The Abstraction Layer 305 is also part of the OS program files 32. The File Access function gives other software layers access to OS Execution Parameters file or User Sequence Program files. The Device Memory Access gives other layers access to Device Memory. The Devices are virtual elements for programming in the Controller's CPU, as well as the components (such as contacts and coils) that compose a program. Virtual elements are part of the programming language used by the Controller's CPU. These virtual elements represent basic building blocks that specify a certain functionality and which are used in a user program. For example, a virtual element (device) may represent a switch. A user may include a switch in his program by including a virtual element corresponding to the switch. The Device Memory is located in volatile memory. The Module Access allows the various software layers to abstractly access some of the External Units. The Communication Data buffer allows the software layers to communicate with the connected devices without requiring use of communication protocols. The Operation Management handles LED, Switch, and Battery. The Operation Management gives the software layers abstract access to LED, Switches.

The final layer is H/W I/F (hardware interface) layer 306. The H/W I/F layer 306 is also part of the OS program files 32 and includes driver programs that interface with hardware resources. The H/W I/F layer 306 includes the Sequence Instruction Execution Engine driver, which handles the control of different modules based on the execution of the sequence instructions. The H/W I/F layer 306 also includes Flash ROM driver, which is a driver for non-volatile memory, the System bus Communication driver, which is a driver for system bus, and a communication driver, which handles the Communication Port.

Figure 7A:
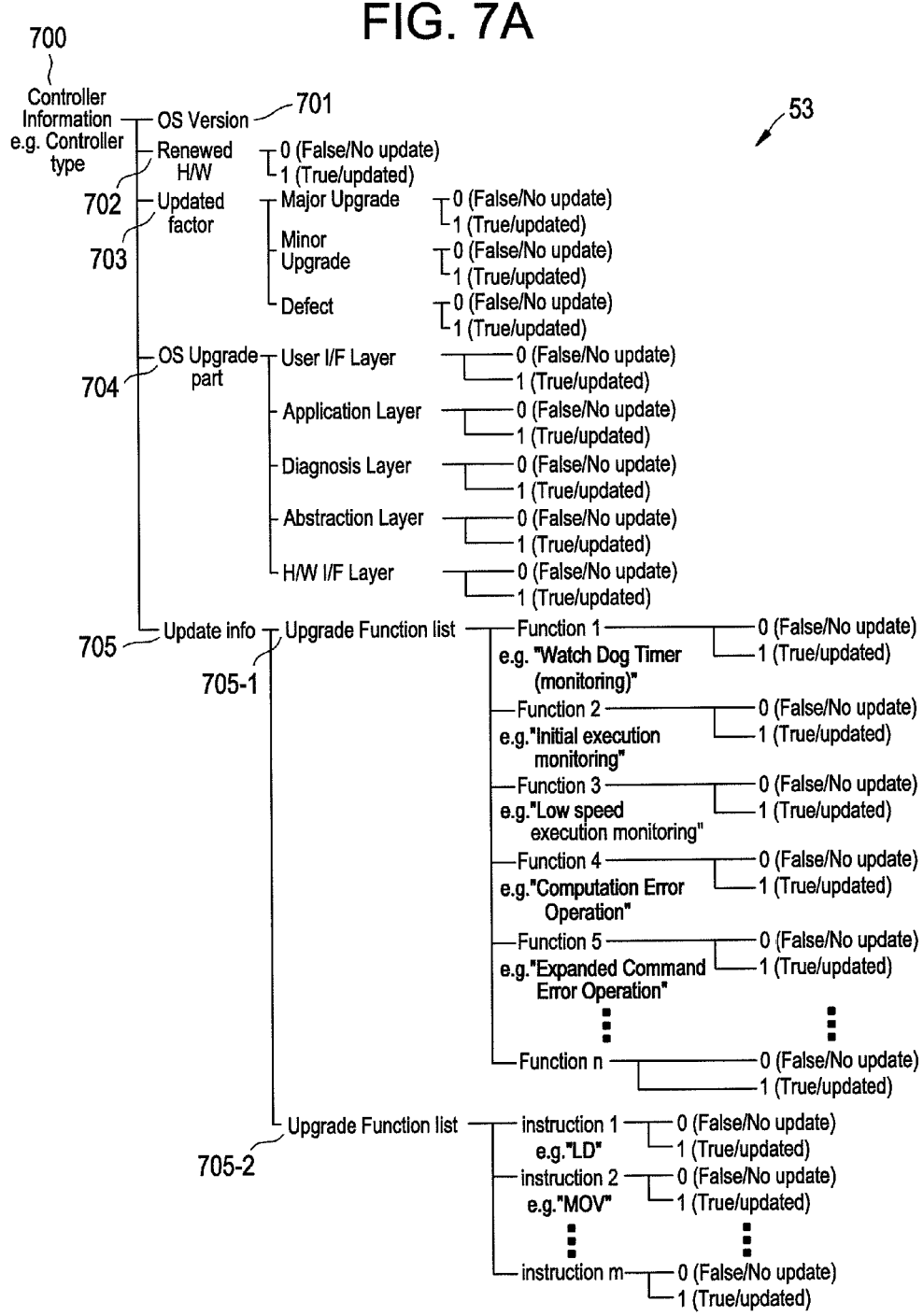
FIGS. 7A and 7B illustrate update information and update software.
Figure 7B:
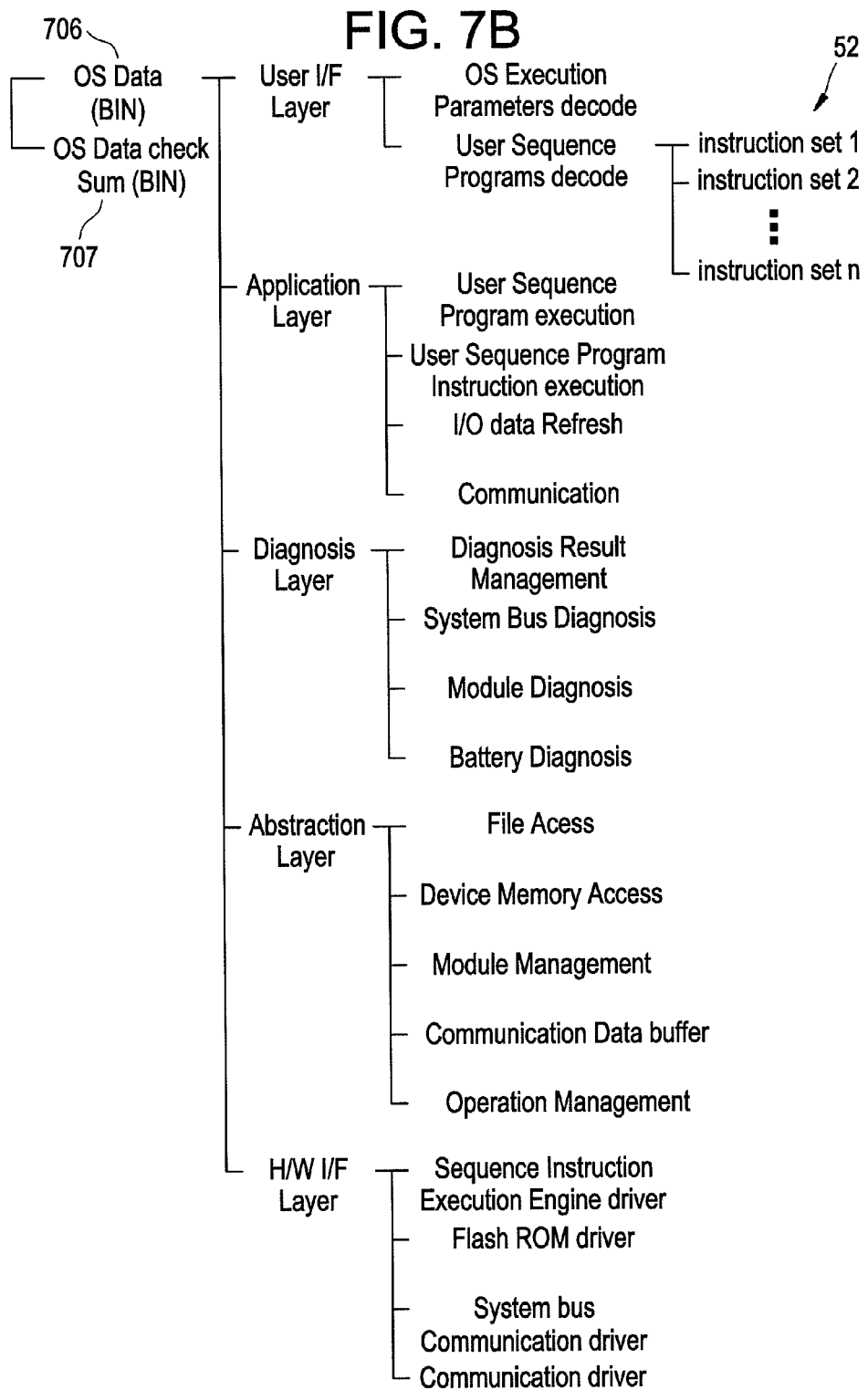

Next, a detailed description of update information 53 will be provided with respect to FIGS. 7A and 7B. The update information 53 and the particular structure described for the update information 53 are important features of this invention that provide the invention unique flexibility in updating the controller's software. The update information 53 is stored in the server 3 and is transferred from server 3 to the programming tool 1 via Internet. It should be noted that any type of network can be used to transfer the update information from server 3 to the programming tool 1. The update software 52 will be installed in the sequencer 2 by programming tool 1 based on the contents of the update information 53. The update software 52 replaces the OS programs 32 completely or replaces parts of the OS program 32, based on the update information 53.

Update information 53 is shown in FIGS. 7A and 7B in a tree structure where the highest entry is "controller type" as shown in this figure. The controller type 700 is information which identifies the model of the controller whom update software 52 targets. Update software 52 different for each model can be prepared when there are two or more models of the controller, and two or more update information 53 can be prepared corresponding to each update software 52 also.

Once the controller type 700 is specified, an OS version 701 is specified for the update software 52. The update information 53 also includes Renewed H/W 702. The Renewed H/W 702 indicates whether the controller includes a faulty hardware design or if a hardware update is required. If the Renewed H/W 702 is true, a message may be displayed to the user of the controller that the hardware must be changed. The message may be displayed through the programming tool 1.

Next, Update Factor 703 includes major upgrade information, minor upgrade information and defect information. The Update Factor 703 also includes information which identifies the severity, i.e., urgency, of the maintenance. Major upgrade is true when the update software 52 includes new functions that do not already exist in the controller. For example, a new function may included in the OS (execution environment) of the controller for communicating via the Internet. The minor upgrade information indicates that certain functions which are already part of controller OS need to be improved and the update software 52 includes the improvement. For example, the update software 52 may implement an extended WDT function. It should be noted that if the minor upgrade field is true, then the severity of the upgrade is low. If the severity is "Low", a user may choose to install the update software at his discretion.

The Defect field in Update Factor 703 indicates whether there is a bug in the execution environment of the controller. More specifically, the Defect field may be true when there is a bug in the OS programs 32. For example, the Defect field may be true when the WDT function doesn't work or WDT function misfetches the parameter from WDT data structure 403. If the Defect field is true, the severity of the upgrade is "High". If the severity is "High", update software 52 may be immediately/compulsorily deployed to the controller because update software 52 is prepared for correction of an essential problem. However, it is possible that the user of the controller may not be using the function which includes the bug. In that case, the user may choose to skip applying the upgrade to the controller OS.

Further, OS upgrade part 704 may specify the OS layer to which the upgrade affects. For example, the update software 52 may only affect the diagnosis layer or may affect both the diagnosis and abstraction layer of the OS programs 32.

Upgrade info 705 is information which identifies parts of OS programs 32 that are affected by the update software 52. This entry has subordinate entries. For example, a first subordinate entry may be an upgrade function list 705-1. The upgrade function list 705-1 specifies functions included in the OS programs 32. For example, if the WDT function is affected, then the upgrade function list 705-1 will specify a true in the update entry next to Function 1. Similarly, if the update software 52 affects other OS functions such as initial execution monitoring, low speed execution monitoring, etc., an update entry may be specified for each of these functions. The upgrade info 705 may also include upgrade instruction list 705-2 as another subordinate entry. The upgrade instruction list 705-2 specifies whether an update is being applied to the different instructions such as LD, MOV, etc.

FIG. 7B graphically illustrates update software 52. The update software 52 includes binary data, which is then applied as an update to the execution environment (OS) of the controller. According to an exemplary implementation, if any of the software layers described in FIG. 3B are to be updated, the update software 52 will include binary data for the particular function in that layer. Therefore, if one of the layers is not to be updated, then the OS data 706 will not include the binary data for updating that layer. Further, the update software 52 may include a check sum 707 for the OS data 706.

Figure 8A:
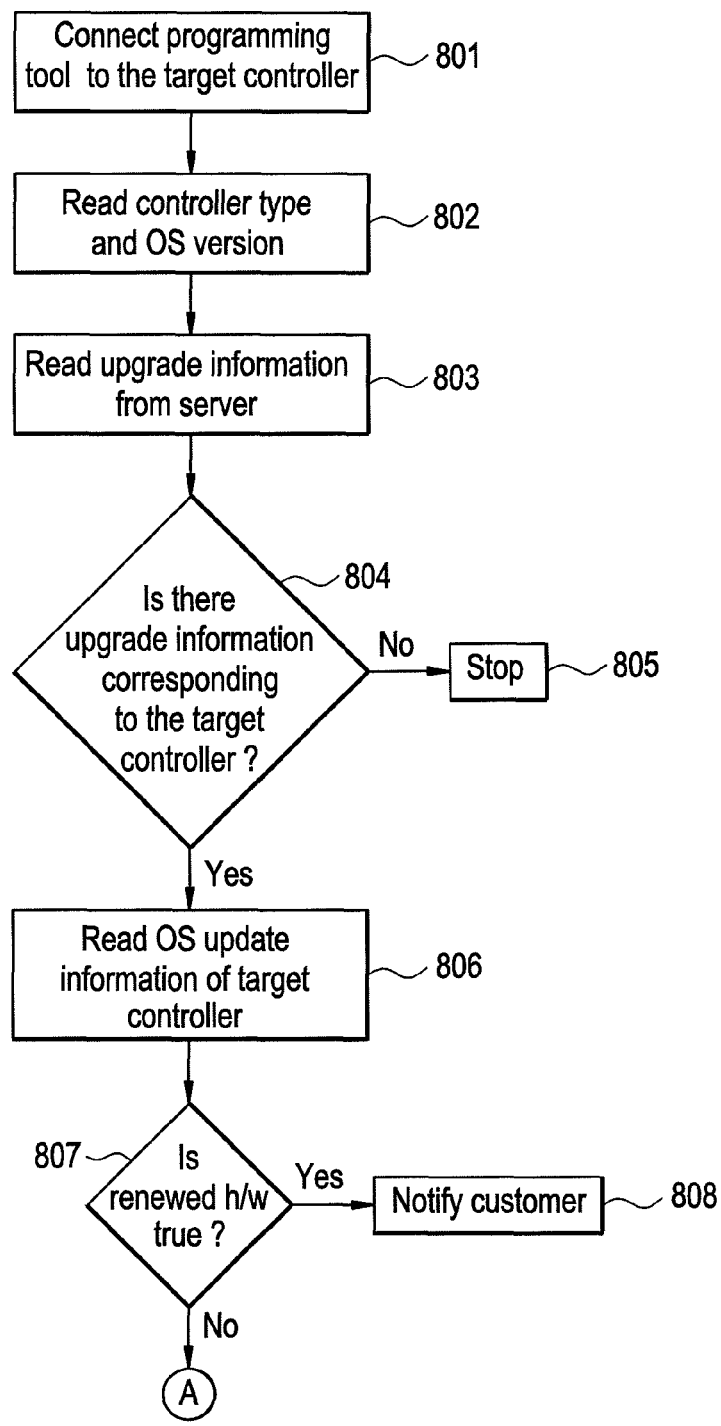
FIGS. 8A and 8B describe the exemplary procedure of FIG. 2 in further detail.
Figure 8B:
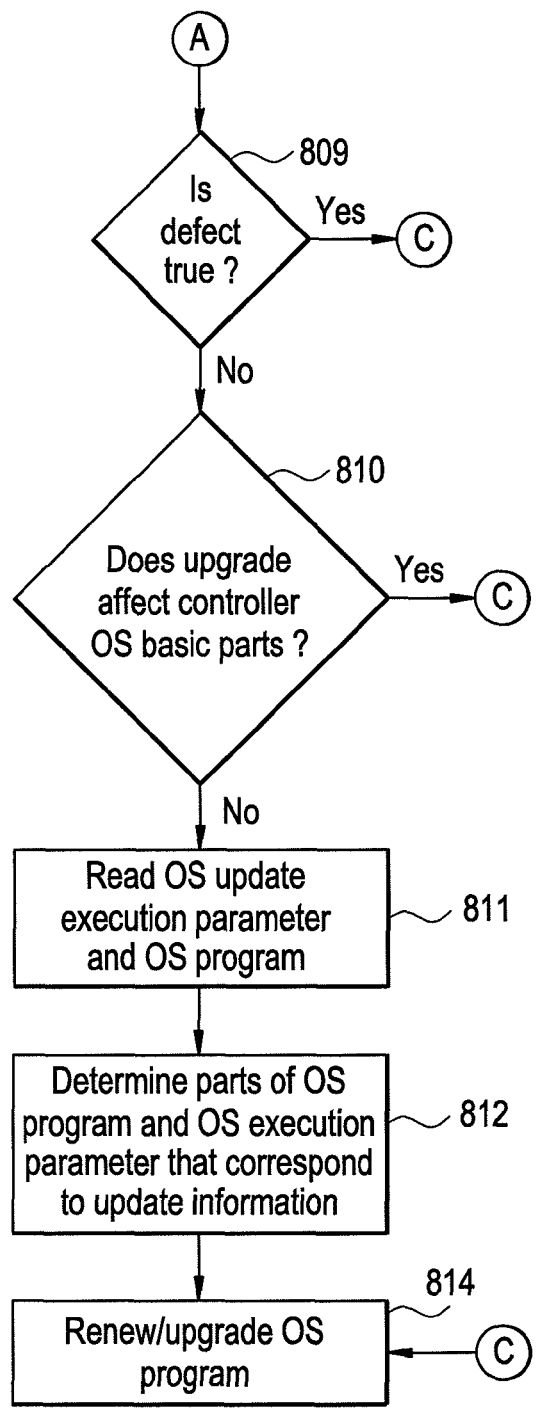

Next, the process of FIG. 2 is explained in greater detail with respect to FIG. 8. In S801, the user connects the programming tool to the target controller in order to perform maintenance on the target controller. The programming tool reads the controller type and OS version information from the target controller in S802. In S803, the programming tool accesses the server 3 to read upgrade information from the server. The server may store upgrade information for more than one controller. Therefore, in S804, the programming tool determines whether there is upgrade information corresponding to the target controller. If there is none, the procedure stops at S805 or the user may decide to perform maintenance on a next controller. It should be noted that each of the steps indicated above can be performed by logic units in the programming tool 1. That is the programming tool may have a first logic unit, which reads the data from the server, a second logic unit which reads the OS version type, etc.

In S804, if it is determined that upgrade information corresponding to the target controller exists in the upgrade information read from the server, the process proceeds to S806. In S806, the OS update information (update information 53 similar to FIG. 7A) is read for the corresponding target controller. It is possible that the programming tool has to parse through the upgrade information to find update information 53 corresponding to the target controller.

Once the update information is determined in S806, in S807 it is checked whether Renewed H/W 702 is true in the update information 53. If it is true, in S808 the administrator may be immediately notified that a hardware change needs to be made to the PLC. For example, the controller may need to be changed. If the answer is NO in S807, the process proceeds to S809 in which it is determined if there are any defects to be corrected by this update. This is determined by checking whether "Defects" information is true under the Updated Factor 703 in the update information 53. If the Defects information is true, the severity of the "upgrade" is high. Accordingly, the process proceeds to S814 and the upgrade is applied to the OS program and OS parameters.

Otherwise, the process proceeds to S810 in which the programming tool checks whether the upgrade/update affects the controller OS basic parts. That is, if any one of Diagnosis Layer, Abstraction Layer, H/W I/F Layer is true under the OS upgrade part 704, the upgrade affects the controller OS basic parts. If S810 yields a YES as its result, the process proceeds directly to step 814 where the update software 52 replaces the corresponding portions of the different layers in the controller OS basic parts. For example, if the abstraction layer has a defect, the update software 52 replaces the abstraction layer in the OS program 32.

If S810 yields a NO as its result, the programming tool reads the OS execution parameter and OS program from the target controller in S811. In S812, the programming tool determines parts of the OS execution parameter and OS program that are affected by the update program 52 by referring to the update information 53. For example, by reading OS execution parameter 31, the programming tool 1 identifies which OS function the user is using. For example, if one of the bits in data structure 403 (See FIG. 4B) is set, that may indicate that a WDT function is using the WDT setting. Furthermore, there may be functions that may not be used by the user but are being affected by the update software 52. The upgrade function list 705-1 provides the list of the functions which are being affected by the update software 52 and based on the functions used by the user, the programming tool may provide an option to the user whether to update those functions. Furthermore, it is possible that if there is no overlap between the upgrade function list and the functions user by the user, then an update may not applied to the OS programs 32. This may occur when a few functions specified in the upgrade function list have defects but these few functions are not being used by the user. Therefore, it may not be necessary to apply an update to those functions in the OS programs 32.

Further, the programming tool may also extract the instructions/operators being used by the user in the ladder program or application programs. The programming tool may then compare the extracted instructions with the instructions in the upgrade instructions list 705-2 and apply an update to the ladder program accordingly.

By the process described above, a user can be provided more control on the upgrade (update) process of the controller operating system. If the user is not using certain functions or programs that will be affected by the upgrade, the upgrade is not applied to the controller.

Figure 9:
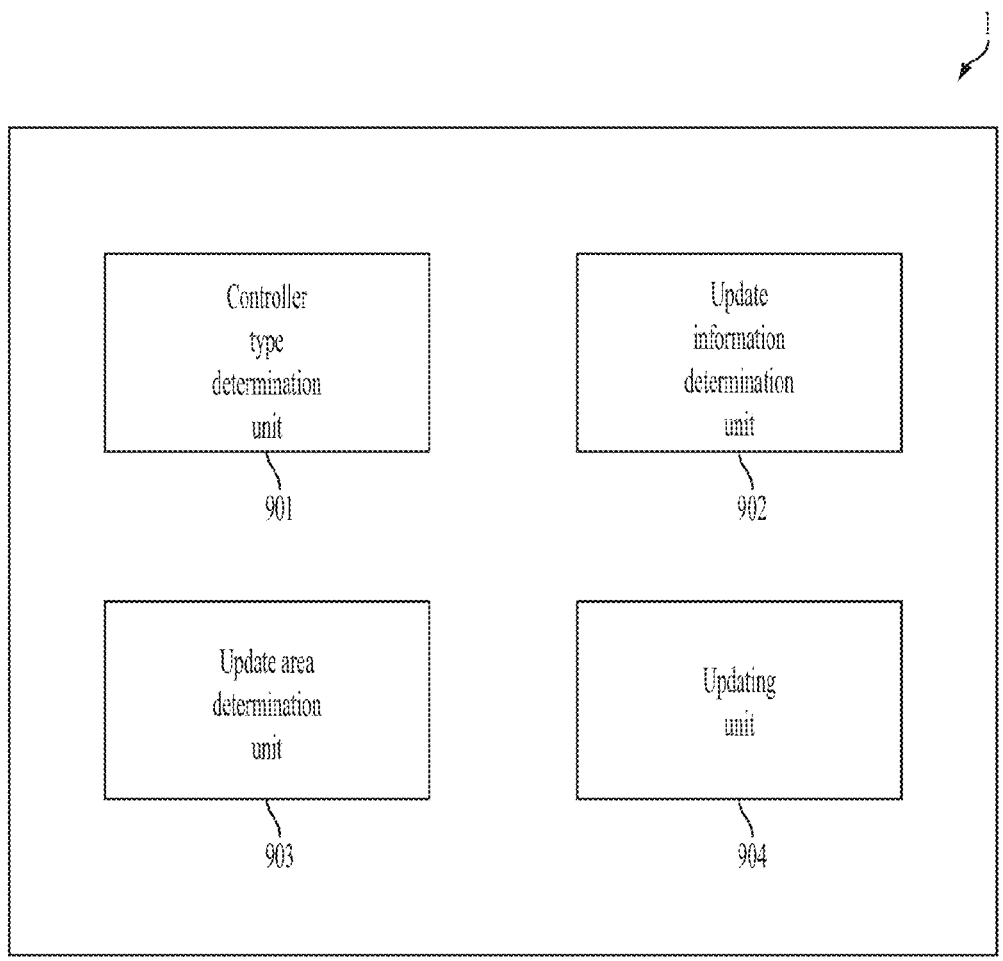
FIG. 9 describes an internal structure of the programming tool.

Next, the internal structure of the programming tool is described in further detail with reference to FIG. 9. The programming tool includes a controller type determination unit 901 for reading a controller type of the controller and version information of the operating system, an update information determination unit 902 for reading update information corresponding to the controller type and version information, an update area determination unit 903 for determining a part of the operating system to be updated based on the update information, and an updating unit 904 for updating the determined part of the operating system.

The update information specifies a part of the operating system to be updated. As described earlier, the update information specifies an upgrade function list, the upgrade function list including information on functions included in the operating system that are to be updated. The update area determination unit 903 may determine whether the functions included in the operating system are used by a user of the controller, by reading an operating system execution parameter, and the updating unit 904 may apply an update to only those functions of the operating system that are being used by the user.

Furthermore, the programming tool may provide an option to the user to select whether to update a function from the upgrade function list, and the updating unit updates only those functions selected by the user.

The update area determination unit 903 may also determine whether a user application program is using an instruction from the plurality of instructions specified in the update information 53 and the updating unit may update the user application program if it is determined that the user application program is using at least one of the plurality of instructions.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks. Furthermore, each of the blocks in FIG. 9 may be implemented by a processor such as an FPGA, ASIC, etc.

These computer program instructions may also be stored in a computer readable medium or more specifically a computer readable storage medium that can direct a computer, or other programmable data processing apparatus, or other devices to function in a particular manner, such that the instructions stored in the computer readable medium produce an article of manufacture including instructions which implement the function/act specified in the flowchart and/or block diagram block or blocks.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of updating an execution environment of a programmable logic controller, the method comprising:
   reading a controller type of the programmable logic controller and version information of an operating system thereof;
   reading update information corresponding to the controller type and the version information, wherein the update information is a hierarchically organized data structure comprising:
   a renewed H/W value indicating whether a hardware update is required for the programmable logic controller, and
   a layered operating system (OS) upgrade data structure comprising a value for each layer of the operating system, each said value indicating whether or not an update software is present for said layer of the operating system;
   determining a part of the execution environment to be updated based on the read update information, wherein the determining comprises, for each layer of the OS of the programmable logic controller, determining whether an upgrade is necessary based on the read value of the corresponding layer in the upgrade information; and
   updating the determined part of the execution environment by retrieving the update software from an external apparatus and replacing corresponding portions of the different layers in the programmable logic controller with the update software.

2. The method of claim 1, wherein the update information specifies an upgrade function list, the upgrade function list including information on functions included in the execution environment that are to be updated.

3. The method of claim 2, further comprising:
   determining whether the functions included in the execution environment are used by a user of the controller, by reading an operating system execution parameter, and applying an update to only those functions of the execution environment that are being used by the user.

4. The method of claim 2, further comprising:
   providing an option to the user to select whether to update a function from the upgrade function list; and
   updating only those functions selected by the user.

5. The method of claim 1, wherein the update information specifies a plurality of instructions to be updated.

6. The method of claim 5, further comprising:
   determining whether a user application program is using an instruction from the plurality of instructions; and
   updating the user application program if determined that the user application program is using at least one of the plurality of instructions.

7. The method of claim 1, wherein the update information further comprises:
- an update factor information including major upgrade information, minor upgrade information, and defect information, wherein the major upgrade value indicates whether an update software includes new functions that do not exist in the programmable logic controller, the minor upgrade value indicates that the update software includes improvements to certain functions which are already part of the OS of the programmable logic controller, and the defect value indicates that the update software corrects a bug in the execution environment of the controller.

8. The method of claim 7, wherein:
- the update factor further comprises information identifying urgency of the upgrade,
- the update information further comprises a value for each function of OS programs indicating whether the upgrade affects the corresponding function, and
- the layers of the OS of the programmable controller comprises a user I/F layer, an application layer, a diagnosis layer, an abstraction layer, and a H/W I/F layer.

9. A system for performing software maintenance of a programmable logic controller, the system comprising:
- a programming tool stored in a memory; and
- a controller comprising a processor,
- wherein the programming tool is operable to update an execution environment of the programmable logic controller and comprises:
  - a controller type determination unit, which is configured to read a controller type of the controller and version information of an operating system thereof;
  - an update information determination unit, which is configured to read update information corresponding to the controller type and the version information, wherein the update information is a hierarchically organized data structure comprising:
    - a renewed H/W value indicating whether a hardware update is required for the programmable logic controller, and
    - a layered operating system (OS) upgrade data structure comprising a value for each layer of the operating system, each said value indicating whether or not an update software is present for said layer of the operating system;
  - an update area determination unit which is configured to determine a part of the execution environment to be updated based on the read update information, wherein the determining unit determines, for each layer of the OS of the programmable logic controller, whether an upgrade is necessary based on the read value of the corresponding layer in the upgrade information; and
  - an updating unit which is configured to update the determined part of the execution environment by retrieving the update software from an external apparatus and replacing corresponding portions of the different OS layer in the programmable logic controller with the update software.

10. The system of claim 9, wherein the update information specifies an upgrade function list, the upgrade function list including information on functions included in the execution environment that are to be updated.

11. The system of claim 10, wherein the update area determination unit determines whether the functions included in the execution environment are used by a user of the controller, by reading an operating system execution parameter, and the updating unit applies an update to only those functions of the execution environment that are being used by the user.

12. The system of claim 10, wherein an option is provided to the user to select whether to update a function from the upgrade function list, and the updating unit updates only those functions selected by the user.

13. The system of claim 9, wherein the update information specifies a plurality of instructions to be updated.

14. The system of claim 13, wherein the update area determination unit determines whether a user application program is using an instruction from the plurality of instructions and the updating unit updates the user application program if it is determined that the user application program is using at least one of the plurality of instructions.

15. A non-transitory computer-readable storage medium for storing instructions for enabling a computer to perform a method of updating an execution environment of a programmable logic controller, the method comprising:
- reading a controller type of the programmable logic controller and version information of an operating system thereof;
- reading update information corresponding to the controller type and the version information, wherein the update information is a hierarchically organized data structure comprising:
  - a renewed H/W value indicating whether a hardware update is required for the programmable logic controller, and
  - a layered operating system (OS) upgrade data structure comprising a value for each layer of the operating system, each said value indicating whether or not an update software is present for said layer of the operating system;
- determining a part of the execution environment to be updated based on the read update information, wherein the determining comprises, for each layer of the OS of the programmable logic controller, determining whether an upgrade is necessary based on the read value of the corresponding layer in the upgrade information; and
- updating the determined part of the execution environment by retrieving the update software from an external apparatus and replacing corresponding portions of the different layers in the programmable logic controller with the update software.

16. The non-transitory computer-readable storage medium of claim 15, wherein the update information specifies an upgrade function list, the upgrade function list including information on functions included in the execution environment that are to be updated.

17. The non-transitory computer-readable storage medium of claim 16, wherein the method further comprises:
- determining whether the functions included in the execution environment are used by a user of the controller, by reading an operating system execution parameter, and
- applying an update to only those functions of the execution environment that are being used by the user.

18. The non-transitory computer-readable storage medium of claim 16, wherein the method further comprises:
- providing an option to the user to select whether to update a function from the upgrade function list; and
- updating only those functions selected by the user.

19. The non-transitory computer-readable storage medium of claim 15, wherein the update information specifies a plurality of instructions to be updated.

20. The non-transitory computer-readable storage medium of claim 19, wherein the method further comprises:
    determining whether a user application program is using an instruction from the plurality of instructions; and
    updating the user application program if determined that the user application program is using at least one of the plurality of instructions.

\* \* \* \* \*